United States Patent
Kruliš et al.

(10) Patent No.: US 7,638,595 B2
(45) Date of Patent: Dec. 29, 2009

(54) METHOD OF RECYCLING OF COMMINGLED PLASTICS WASTE TO TOUGH THERMOPLASTIC MATERIALS

(75) Inventors: Zdeněk Kruliš, Stodulky (CS); Danuše Michálková, Prague (CS); Ivan Fortelný, Nové Mesto (CS); Zdeněk Horák, Prague (CS)

(73) Assignee: Ústav Makromolekulární Chemie Akademie Ved České Republiky, Prague (CZ)

( * ) Notice: Subject to any disclaimer, the term of this patent is extended or adjusted under 35 U.S.C. 154(b) by 87 days.

(21) Appl. No.: 10/532,029

(22) PCT Filed: Oct. 27, 2003

(86) PCT No.: PCT/CZ03/00059
§ 371 (c)(1),
(2), (4) Date: Apr. 21, 2005

(87) PCT Pub. No.: WO2004/039875
PCT Pub. Date: May 13, 2004

(65) Prior Publication Data
US 2006/0058461 A1  Mar. 16, 2006

(30) Foreign Application Priority Data
Oct. 30, 2002  (CS) .................................. 2002-3589

(51) Int. Cl.
*C08G 64/00* (2006.01)
(52) U.S. Cl. .............. 528/480; 264/140; 264/176.1; 264/219; 428/343; 428/500; 528/481; 528/501
(58) Field of Classification Search ............. 264/140, 264/176, 1, 219, 176.1; 428/343, 500; 528/480
See application file for complete search history.

(56) References Cited
U.S. PATENT DOCUMENTS
4,212,789 A * 7/1980 Anspon ................. 525/257
6,784,233 B1 * 8/2004 Weber et al. ............ 524/126

* cited by examiner

*Primary Examiner*—Terressa M Boykin
(74) *Attorney, Agent, or Firm*—Notaro & Michalos P.C.

(57) ABSTRACT

A method of recycling commingled plastics waste containing min. 30 wt. % of polyolefins to a tough thermoplastic material, based on the compatibilization of the polymer components of commingled plastics waste with an admixture of 2-15 wt. % of an ethylene--propylene copolymer or a styrene--butadiene block copolymer or a combination of an ethylene--propylene copolymer and a styrene--butadiene copolymer in any weight ratio, together with 0.1-2.5 wt. % of a secondary aromatic amine and by subsequent blend processing in the melt.

3 Claims, No Drawings

METHOD OF RECYCLING OF COMMINGLED PLASTICS WASTE TO TOUGH THERMOPLASTIC MATERIALS

TECHNICAL FIELD

The invention concerns recycling of commingled plastics waste to tough thermoplastic materials.

BACKGROUND ART

Immiscibility of components of commingled plastics waste recyclates is the greatest barrier to achieving its utilizable application properties. The immiscibility of different polymers itself, caused by thermodynamic limitations, would not be a hindrance to the preparation of materials with practically utilizable properties if the condition of their mutual compatibility were fulfilled. (Compatibility is generally understood as the ability of immiscible polymers to form such supramolecular structure of the resulting blend that enables achieving material properties close to or better than those of polymer components of the blend.) However, mutual compatibility of most thermoplastic polymers is very low. From mutual immiscibility and low interphase adhesion result strong separation trends of the blend components. All material properties dependent on stress transfer (tensile strength, ductility, toughness) in such blends remain deep below the level corresponding to the additivity rule. The materials thus characterized are practically unusable.

Separation tendencies of components of blends of mutually immiscible polymers can be efficiently suppressed by their compatibilization. As efficient compatibilizers of polyolefin blends proved successful statistical and block ethylene—propylene copolymers (e.g., according to DE 28 49 114, U.S. Pat. No. 4,319,005 or U.S. Pat. No. 4,567,847), and styrene—butadiene or hydrogenated styrene—butadiene block copolymers or their blends with ethylene—propylene copolymers for compatibilization of polyolefin—polystyrene mixtures (e.g., according to Czech Application PV 2000-525). In addition to the additive compatibilizers, also reactive systems based on initiated radical reactions of polyolefin components were successfully tested (e.g., according to Czech patents CZ 284819 and CZ 284862).

Used plastic packings and multimaterial products of short and medium lifetimes from households and small firms are the largest source of plastics waste. The commingled plastics waste consists of approximately 65% polyolefins (low-density and high-density polyethylene, polypropylene), 11% polystyrene plastics, 13% polyester plastics (mainly poly (ethylene terephthalate)) and small proportions of poly(vinyl chloride) plastics and polyamides. Plastics waste coming from municipal scrap is usually unsorted or with removed, usually incompletely, poly(ethylene terephthalate) bottles. Polymer components of the waste are devalued to various extent by thermal and weathering degradation and, in addition, the waste contains other contaminants of various origin. The strength characteristics of blends of thermoplastics damaged by degradation are even worse than with those undamaged by degradation. Sorting and cleaning of the blends is a technologically complex and energetically demanding process. For processing of commingled plastics waste, a special technology developed for the purpose is often used, based on mixing a commingled plastics melt in an extruder-and-immediate extrusion of the melt into a mold. The advantage of this method of processing of commingled plastics waste consists in that comparatively large articles can be easily obtained. A drawback is not quite good mechanical properties of the final recyclate, which can hence compete in applications only with cheap sorts of wood or concrete. This recycling method is suitable for production of massive articles fulfilling only low aesthetic and strength demands. The economical balance of the recycling method for commingled plastics waste is not very good and is usually close to the cost-effectiveness limit.

In the study of structure and properties of commingled thermoplastic waste, it was surprisingly found out that an admixture of an ethylene—propylene copolymer or styrene—butadiene block copolymer in combination with secondary aromatic amines leads, after subsequent processing of the blend by melt mixing, to considerable enhancement of toughness of the resulting material. Further it was found out that an admixture of an ethylene—propylene copolymer or styrene—butadiene block copolymer in combination with secondary aromatic amines to mixed degradation-damaged plastics containing polyolefins and polystyrene exhibits a synergistic compatibilization effect, i.e., the toughness of the resulting material is considerably higher than that of the same mixed degradation-damaged plastics compatibilized with an admixture of an ethylene—propylene copolymer alone or styrene—butadiene block copolymer alone or with a combination of an ethylene—propylene copolymer and styrene—butadiene block copolymer. The compatibilization efficiency of the method according to the invention is noticeably higher with degradation-damaged commingled plastics waste containing polyolefins and styrene plastics, where the hitherto used compatibilization methods practically fail.

The recyclate of commingled plastics waste compatibilized by the method according to the invention can then show high toughness while maintaining a balanced complex of the other utility values.

DISCLOSURE OF INVENTION

The disclosure of the invention is the method of recycling of commingled plastics waste containing at least 30 wt. % of polyolefins to a tough thermoplastic material characterized in that polymer components of commingled plastics waste are compatibilized by an admixture of 2-15 wt. % of ethylene—propylene copolymer (i) or styrene—butadiene block copolymer (ii) or a combination of ethylene—propylene copolymer (i) and styrene—butadiene copolymer (ii) in any weight ratio and 0.1-2.5 wt. % of a secondary aromatic amine (iii) and by subsequent processing of the blend in melt.

A further characteristic of the method according to the present invention is that an ethylene—propylene copolymer (i) is the copolymer with an average molecular weight $M_w$ of 40000-800000, which contains min. 15% and max. 60% of propylene units, a styrene—butadiene block copolymer (ii) is the copolymer with an average molecular weight $M_w$ of 40000-300000, which contains min. 15% and max. 60% of styrene units with an average molecular weight $M_w$ of polystyrene blocks of min. 6000 and max. 60000, and a secondary aromatic amine (iii) is selected from the group consisting of N,N'-diaryl-1,4-phenylenediamine, N-alkyl-N'-aryl-1,4-phenylenediamine and the reaction product of diphenylamine and acetone.

The advantages of the compatibilization method according to the invention are explained on the following examples. The used code and symbols have the following meaning:
LDPE=low-density polyethylene
HDPE=high-density polyethylene
PP=polypropylene
PS=polystyrene
HIPS=tough polystyrene (styrene—butadiene copolymer)
PET=poly(ethylene terephthalate)

EPDM=ethylene-propylene copolymer
SBS=styrene—butadiene—styrene block copolymer
DPA diphenylamine
Aminox=reaction product of diphenylamine and acetone (a mixture of aromatic secondary amines)
UOP588=N-(1,3-dimethylbutyl)-N'-phenyl-1,4-phenylenediamine
Dusantox=a mixture of two secondary aromatic amines consisting of 60 wt. % of N-(1,3-dimethylbutyl)-N'-phenyl-1,4-phenylenediamine and 40 wt. % of N-[4-(α,α-dimethylbenzyl)phenyl]-N'-(1,3-dimethylbutyl)-1,4-phenylenediamine
$\alpha_\epsilon$=tensile impact strength (kJ/m$^2$)

EXAMPLES

Example 1

The compatibilization procedure was applied to a sample of commingled plastics waste processed in Transform Co., Czech Republic (Trans V) of the following composition (determined by extraction and DSC measurement): low-density polyethylene (LDPE) 22.8%, high-density polyethylene (HDPE) 26.5%, isotactic polypropylene (PP) 30.4%, polystyrene (PS) 18.0% and poly(ethylene terephthalate) (PET) 2.3%. As compatibilization system components, we used EPDM elastomer Buna AP 437 and styrene—butadiene—styrene block copolymer (SBS) Europrene SOL T 168. We have tested the following secondary aromatic amines: reaction product of diphenylamine with acetone (Aminox), N-(1,3-dimethylbutyl)-N'-phenyl-1,4-phenylenediamine (UOP588) and diphenylamine (DPA). The blends were stirred in the chamber of a Brabender plastometer at 240° C. at a kneader speed of 90 min$^{-1}$ for 8 min. The compatibilization efficiency was characterized by tensile impact strength ($\alpha_\epsilon$) values at 23° C., determined on a Zwick apparatus according to DIN 53448. The specimens were prepared from plates pressed on a laboratory press Fontijne. The $\alpha_\epsilon$ values in dependence on the composition of the compatibilization system are given in Table 1.

TABLE 1

The dependence of tensile impact strength ($\alpha_\epsilon$) of commingled plastics waste Trans V on the composition of the compatibilization system

| Blend: | I | II | III | IV | V | VI | VII | VIII |
|---|---|---|---|---|---|---|---|---|
| Trans V (%) | 100 | 95 | 95 | 95 | 95 | 95 | 95 | 95 |
| EPDM (%) | 0 | 1 | 1 | 1 | 1 | 2.5 | 2.5 | 2.5 |
| SBS (%) | 0 | 4 | 4 | 4 | 4 | 2.5 | 2.5 | 2.5 |
| UOP588 (pph) | 0 | 0 | 0.5 | 0 | 0 | 0.5 | 0 | 0 |
| DPA (pph) | 0 | 0 | 0 | 0.5 | 0 | 0 | 0.5 | 0 |
| Aminox (pph) | 0 | 0 | 0 | 0 | 0.5 | 0 | 0 | 0.5 |
| $\alpha_\epsilon$ (kJ/m$^2$) | 23.9 | 65.3 | 93.7 | 102.3 | 125 | 150 | 72.4 | 75.1 |

It clearly follows from Table 1 that the compatibilized blends show several-times higher toughness and that there a pronounced synergy between an EPDM/SBS mixture and secondary aromatic amines.

Example 2

In Table 2 are given the results of measurement of tensile impact strength for model blends of thermally aged (in a press at 200° C. for 1 h) of low-density polyethylene Bralen RA 2-19 (sLDPE) with a virgin sample of polystyrene homopolymer Krasten 171 (PS) and PET sample from recycled bottles (rPET). The compatibilization system components, EPDM and SBS, and the conditions of blend mixing and specimen preparation are the same as in Example 1. In contrast to the preceding example, a mixture of two secondary aromatic amines was used consisting of 60 wt. % of N-(1,3-dimethylbutyl)-N'-phenyl-1,4-phenylenediamine and 40 wt. % of N-[4-(α,α-dimethylbenzyl)phenyl]-N'-(1,3-dimethylbutyl)-1,4-phenylenediamine (Dusantox). In Table 3, the results of an analogous study are given, where homopolymer Krasten 171 was replaced by tough polystyrene Krasten 562 (HIPS).

TABLE 2

Dependence of tensile impact strength ($\alpha_\epsilon$) of sLDPE/PS and sLDPE/PS/rPET model blends on the composition of the compatibilization system

| Blend: | K1 | K2 | K3 | K4 | K5 | K6 |
|---|---|---|---|---|---|---|
| sLDPE (%) | 70 | 66.5 | 63 | 66.5 | 66.5 | 70 |
| PS (%) | 30 | 28.5 | 27 | 28.5 | 28.5 | 30 |
| rPET (%) | 0 | 5 | 5 | 0 | 5 | 0 |
| EPDM (%) | 0 | 0 | 2.5 | 2.5 | 0 | 0 |
| SBS (%) | 0 | 0 | 2.5 | 2.5 | 0 | 0 |
| Dusantox (pph) | 0 | 0 | 0.5 | 0.5 | 0.5 | 0.5 |
| $\alpha_\epsilon$ (kJ/m$^2$) | 9.9 | 10.1 | 75.2 | 84.0 | 12.6 | 15.2 |

TABLE 3

Dependence of tensile impact strength ($\alpha_\epsilon$) of sLDPE/HIPS and sLDPE/HIPS/rPET model blends on the composition of the compatibilization system.

| Blend | E1 | E2 | E3 | E4 | E5 | E6 |
|---|---|---|---|---|---|---|
| sLDPE (%) | 70 | 66.5 | 63 | 66.5 | 63 | 66.5 |
| HIPS (%) | 30 | 28.5 | 27 | 28.5 | 27 | 28.5 |
| rPET (%) | 0 | 5 | 5 | 0 | 5 | 0 |
| EPDM (%) | 0 | 0 | 2.5 | 2.5 | 2.5 | 2.5 |
| SBS (%) | 0 | 0 | 2.5 | 2.5 | 2.5 | 2.5 |
| Dusantox (pph) | 0 | 0 | 0 | 0 | 0.5 | 0.5 |
| $\alpha_\epsilon$ (kJ/m$^2$) | 28.0 | 15.3 | 52.0 | 50.0 | 97.0 | 145.0 |

It follows from Tables 2 and 3 that an admixture of a small amount of a mixture of an ethylene—propylene elastomer with a styrene—butadiene block copolymer and substituted 1,4-phenylenediamines (Dusantox) enhances several times the toughness of aged low-density polyethylene—polystyrene blends with or without an admixture of poly(ethylene terephthalate). From the tables, the synergy between the action of the copolymer mixture and 1,4-phenylenediamine derivatives is evident.

Example 3

The values of toughness in tensile impact strength of samples prepared under production conditions in Transform Co., Czech Republic are given in Table 4. The mixtures were prepared by extrusion on a one-screw extruder of Transform Co. at basic setting of technological conditions for production of pallets and cable troughs. The basic raw material was a production blend Standard (Trans S), the components of the compatibilization system were ethylene—propylene elastomer Exxelor X1 703F1 (EPM), styrene—butadiene—styrene block copolymer Vector 4461 (SBS), and a mixture of 60 wt. % of N-(1,3-dimethylbutyl)-N'-phenyl-1,4-phenylenediamine and 40 wt. % of N-[4-(α,α-dimethylbenzyl)phenyl]-N'-(1,3-dimethylbutyl)-1,4-phenylenediamine (Dusantox). Specimens for measurements of tensile impact strength ($\alpha_\epsilon$) were prepared from the material taken from cable troughs. The material was mixed in the chamber of a Brabender plastometer W50EHT at 190° C. for a kneader speed of 60 min$^{-1}$ a period of 8 min and pressed into plates on a laboratory press Fontijne at 200° C. for a period of 4 min. The measurement of $\alpha_\epsilon$ proceeded by the procedure described in Example 1.

TABLE 4

Effect of compatibilization on tensile impact strength ($\alpha_\epsilon$) of blends prepared under production conditions

| Blend: | 1 | 2 | 3 | 4 |
|---|---|---|---|---|
| Trans S (%) | 100 | 95 | 97.5 | 100 |
| EPM (%) | 0 | 1 | 0.5 | 0 |
| SBS (%) | 0 | 4 | 2 | 0 |
| Dusantox (pph) | 0 | 0.2 | 0.2 | 0.2 |
| $\alpha_\epsilon$ (kJ/m$^2$) | 4.3 | 11.1 | 9.2 | 6.3 |

Example 4

The results of a study of the dependence of toughness of compatibilized commingled plastics waste on the types of ethylene—propylene elastomer and styrene—butadiene block copolymer are given in Table 5. A production blend from Transform Co., Czech Republic (Trans VS) was used a starting raw material. Ethylene—propylene elastomers Buna AP 337 (EP1), Dutral Co 034 (EP2) and Dutral Co 038 (EP3), and styrene—butadiene block copolymers Europrene SOL T 168 (SB1), Vector 6241 (SB2) and Europrene SOL T 6414 (SB3) in combination with a mixture of 60 wt. % of N-(1,3-dimethylbutyl)-N'-phenyl-1,4-phenylenediamine and 40 wt. % of N-[4-(α,α-dimethylbenzyl)phenyl]-N'-(1,3-dimethylbutyl)-1,4-phenylenediamine (Dusantox). Commingled plastics waste with the compatibilization system were mixed in the chamber of a Brabender plastometer W50EHT at 240° C. and at a kneader speed of 90 min$^{-1}$ for a period of 5 min. Specimens for measurement of tensile impact strength were prepared by pressing in a laboratory press for a period of 10 s. The tensile impact strength ($\alpha_\epsilon$) was measured by the method described in Example 1.

TABLE 5

Dependence of tensile impact strength ($\alpha_\epsilon$) of commingled plastics waste on the composition of the compatibilization system

| Blend: | I | II | III | IV | V | VI |
|---|---|---|---|---|---|---|
| Trans VS (%) | 100 | 100 | 95 | 95 | 95 | 95 |
| SB1 (%) | 0 | 0 | 0 | 0 | 0 | 2.5 |
| SB2 (%) | 0 | 0 | 2.5 | 2.5 | 0 | 0 |
| SB3 (%) | 0 | 0 | 0 | 0 | 2.5 | 0 |
| EP1 (%) | 0 | 0 | 0 | 0 | 0 | 2.5 |
| EP2 (%) | 0 | 0 | 2.5 | 0 | 0 | 0 |
| EP3 (%) | 0 | 0 | 0 | 2.5 | 2.5 | 0 |
| Dusantox (pph) | 0 | 0.5 | 0.5 | 0.5 | 0.5 | 0.5 |
| $\alpha_\epsilon$ (kJ/m$^2$) | 9.2 | 13.1 | 20.2 | 16.3 | 15.0 | 25.0 |

It follows from Table 5 that all the used combinations of SB copolymers and EP elastomers exert a favourable influence on the toughness of commingled plastics waste even though the achieved values of $\alpha_\epsilon$ depend on their structure.

INDUSTRIAL APPLICABILITY

The method of recycling commingled plastics waste containing min. 30 wt. % of polyolefins to tough thermoplastic material is envisaged for industrial utilization in the field of:
1. material recycling of commingled polyolefin, polystyrene and other types of plastics waste to a secondary mixed material or directly to secondary articles
2. preparation of new materials based on mixed polyolefin—polystyrene materials.

The invention claimed is:

1. A method for compatibilizing polymer components in commingled plastic waste recyclates, said recyclates comprising at least 30 wt. % of polyolefins, in order to form a tough thermoplastic material, said method comprising the steps of:

admixing said commingled plastic waste recyclates with a compatibilization system comprised of 2-15 wt. % of an ethylene--propylene copolymer (i) or a styrene--butadiene block copolymer (ii) or a combination of an ethylene--propylene copolymer (i) and a styrene--butadiene copolymer (ii) in any weight ratio together, with 0.1-2.5 wt. % N,N'-diaryl-1 4-phenylenediamine or N-alkyl-N'-aryl-1 4-phenylenediamine or reaction product of diphenylamine and acetone or their mixture (iii) to create an admixture; and melt processing said admixture.

2. The method of recycling commingled plastics waste containing min. 30 wt. % of polyolefins to a tough thermoplastic material according to claim 1, wherein the ethylene--propylene copolymer (i) is a copolymer with an average molecular weight Mw of 40000-800000, which contains min. 15% and max. 60% of propylene units, the styrene--butadiene block copolymer (ii) is a copolymer with an average molecular weight Mw of 40000-300000, which contains min. 15% and max. 60% of polystyrene blocks with an average molecular weight Mw of polystyrene blocks of min. 6000 and max. 60000.

3. A method according to claim 1, wherein melt processing of said admixture is performed in one of, a batch kneader, a one screw extruder and a two screw extruder.

* * * * *